(12) United States Patent
Nickel et al.

(10) Patent No.: US 10,491,419 B2
(45) Date of Patent: Nov. 26, 2019

(54) USER STATION FOR A COMMUNICATION SYSTEM AND METHOD FOR HIGH-DATA RATE CAN-BASED COMMUNICATION

(71) Applicant: Robert Bosch GmbH, Stuttgart (DE)

(72) Inventors: Patrick Nickel, Birstein (DE); Thomas Hogenmueller, Leonberg-Gebersheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/519,216

(22) PCT Filed: Oct. 9, 2015

(86) PCT No.: PCT/EP2015/073368
§ 371 (c)(1),
(2) Date: Apr. 14, 2017

(87) PCT Pub. No.: WO2016/062560
PCT Pub. Date: Apr. 28, 2016

(65) Prior Publication Data
US 2017/0230195 A1 Aug. 10, 2017

(30) Foreign Application Priority Data

Oct. 21, 2014 (DE) .................. 10 2014 221 346

(51) Int. Cl.
*H04L 12/43* (2006.01)
*H04L 12/403* (2006.01)
(Continued)

(52) U.S. Cl.
CPC .... *H04L 12/4035* (2013.01); *H04L 12/40182* (2013.01); *H04L 12/40189* (2013.01); *H04L 12/413* (2013.01); *H04L 2012/40215* (2013.01)

(58) Field of Classification Search
CPC ................. H04L 12/40; H04L 12/4013; H04L 12/40169; H04L 12/40182;
(Continued)

(56) References Cited

U.S. PATENT DOCUMENTS

| 6,404,756 B1 | 6/2002 | Whitehill et al. | |
|---|---|---|---|
| 7,246,186 B2 * | 7/2007 | Hall | G06F 11/1625 370/337 |

(Continued)

FOREIGN PATENT DOCUMENTS

| EP | 1360810 A2 | 11/2003 |
|---|---|---|
| JP | H08307442 A | 11/1996 |

(Continued)

OTHER PUBLICATIONS

Yang et al, Design of FlexRay—CAN Gateway using Node Mapping Method for In-vehicle Networking Systems, IEEE, 3 pages, Oct. 2011.*

(Continued)

*Primary Examiner* — Frank Duong
(74) *Attorney, Agent, or Firm* — Norton Rose Fulbright US LLP; Gerard Messina

(57) ABSTRACT

A user station for a bus system and a method for broadband CAN communication are provided. The user station includes a control unit for controlling an access of the user station via a first bus system to a bus of a second bus system of the communication system, the first bus system being designed for a communication, in which at least at times an exclusive, collision-free access of one of at least two user stations of the communication system to a bus of the first bus system is ensured, and the bus of the second bus system having at least two channels, via which it is possible to transmit messages
(Continued)

of the at least two user stations of the communication system in different separate frequency ranges temporally independently of one another.

17 Claims, 2 Drawing Sheets

(51) Int. Cl.
*H04L 12/40* (2006.01)
*H04L 12/413* (2006.01)

(58) Field of Classification Search
CPC ............ H04L 12/40189; H04L 12/403; H04L 12/4035; H04L 12/4135; H04L 2012/40215; H04L 2012/40273; G05B 2219/25031; G05B 2219/25032
See application file for complete search history.

(56) References Cited

U.S. PATENT DOCUMENTS

| | | | | |
|---|---|---|---|---|
| 7,474,625 | B2* | 1/2009 | Ungermann | G06F 11/2005 370/252 |
| 7,586,953 | B2* | 9/2009 | Forest | H04L 12/417 370/230 |
| 2006/0262814 | A1 | 11/2006 | Ungermann et al. | |
| 2007/0140294 | A1* | 6/2007 | Takatori | H04L 12/40032 370/466 |
| 2014/0023089 | A1* | 1/2014 | Hartwich | H04L 12/40169 370/468 |
| 2015/0055473 | A1* | 2/2015 | Moriya | H04L 12/40006 370/235 |

FOREIGN PATENT DOCUMENTS

| | | |
|---|---|---|
| JP | H10327173 A | 12/1998 |
| JP | 2006527942 A | 12/2006 |
| WO | 2010146002 A1 | 12/2010 |

OTHER PUBLICATIONS

Rui et al, Gateway System for CAN and FlexRay in Automotive ECU Networks, IEEE, 5 pages, 2010.*
Bosch, CAN with Flexible Data-Rate Specification Version 1.0, 34 pages, Apr. 2012.*
Rahim et al, Comparison of CAN, TTP and Flexray Communication Protocols, International Journal of Innovative Research in Computer and Communication Engineering, vol. 2, Special Issue 4, 12 pages, Sep. 2014.*
Elmenreich, Time-Triggered Fieldbus Networks—State of the Art and Future Applications, IEEE, 7 pages, May 2008.*
International Search Report dated Dec. 21, 2015, of the corresponding International Application PCT/EP2015/073368 filed Oct. 9, 2015.
International Standard ISO11898-1, "Road vehicles—Controller area network (CAN) Part 1: Data link layer and physical signalling" Dec. 1, 2003.
CAN with flexible Data-Rate, Specification Version 1.0, dated Apr. 17, 2012.

* cited by examiner

USER STATION FOR A COMMUNICATION SYSTEM AND METHOD FOR HIGH-DATA RATE CAN-BASED COMMUNICATION

FIELD

The present invention relates to a user station for a communication system and to a method for high-data rate CAN-based communication, in which a high-rate transmission system having multiple possible transmission frequencies in the high-frequency range is combined with a CAN system.

BACKGROUND INFORMATION

The CAN bus system is used in communication between sensors and control units, for example in automobiles. In a CAN bus system, messages are transmitted using the CAN protocol, as described in the CAN specification in ISO11898.

Automotive bus systems in particular are continuously developed to achieve greater bandwidths, lower latencies and stricter real-time capability. For this purpose, technologies are known, for example CAN FD, in which messages are transmitted in accordance with specification "CAN with Flexible Data-Rate, Specification Version 1.0" (Source http://www.semiconductors.bosch.de), etc. In such technologies, the maximally possible data rate is increased in the area of the data fields beyond a value of 1 MBit/s by using higher clocking.

Nevertheless, there is also the need to develop already existing CAN bus systems further to achieve higher speeds beyond CAN FD.

SUMMARY

It is an object of the present invention to provide a user station for a communication system and a method that solve the previously mentioned problems. In particular, a user station for a communication system and a method are to be provided, which allow for a further development of the CAN signal structures and necessary communication devices to achieve higher data rates and a mixed operation with conventional CAN user stations.

The object may be attained by an example user station for a communication system in accordance with the present invention. The user station includes a control unit for controlling an access of the user station via a first bus system to a bus of a second bus system of the communication system, the first bus system being designed for a communication, in which at least at times an exclusive, collision-free access of one of at least two user stations of the communication system to a bus of the first bus system is ensured, and the bus of the second bus system having at least two channels, via which it is possible to transmit messages of the at least two user stations of the communication system in distinct separate frequency ranges temporally independently of one another.

The user station provides a further development of the CAN bus to higher data rates, an existing CAN communication being supplemented with corresponding communication devices in the process. This facilitates the use of expanded user stations or nodes in mixed bus systems or networks with conventional CAN user stations. For this purpose, it may be necessary to exchange the transmission/receiving devices (transceivers). It is possible, however, to continue to use existing microcontrollers having integrated CAN controllers.

In accordance with the present invention, the physical layer is implemented in the user station, which allows for a further development of the CAN signal structures and the necessary communication devices to achieve higher data rates than CAN FD.

Advantageous further developments of the user station are described herein.

According to one exemplary embodiment, following the enabling of an access of the user station to one of the at least two channels of the bus of the second bus system, the control unit is able to have access to the channel for an arbitrary period of time in order to transmit a message of arbitrary length via the channel of the second bus system. It is also possible, however, that the length of a message via the at least two channels of the second bus system is approximately equal to twice the length of a message that is defined for the first bus system. Alternatively or additionally, it is also possible that a maximum busy time of the at least two channels of the second bus system is defined. Alternatively or additionally, it is also possible to define fixed signal patterns with an automatic release following the maximum busy time.

It is also possible that the first bus system is designed for transmitting messages according to the CAN protocol and that the second bus system is designed for transmitting messages via at least two high-frequency channels and for higher rate communication than via the first bus system.

It is possible that the bus of the first bus system and the at least two channels of the second bus system are implemented on the same medium or on separate parallel media.

It is advantageous if the control unit is designed, prior to transmitting a message via a predetermined channel of the second bus system, to transmit a message via the bus of the first bus system that the predetermined channel is busy. This makes it possible to detect an occupancy of the predetermined channel. Optionally, the control unit may also be designed, following the termination of the transmission of the message via the predetermined channel of the second bus system, to transmit a message about the termination via the first bus system.

The user station may additionally have a memory device for storing information about an occupancy status of the at least two channels of the second bus system, the control unit being designed to monitor the current occupancy status of the at least two channels of the second bus system and to update the information about the occupancy status stored in the memory device on the basis of the monitoring.

In one embodiment, a bundling of the at least two channels may be flexible and/or, in the user station, a number of usable frequencies of the at least two channels for receiving a message may differ from the number of usable frequencies for the reception in the additional user station.

In one advantageous development, the control unit is designed to arrange the order of the messages according to priority for an exclusive, collision-free access of a user station to one of the at least two channels of the second bus system.

The previously described user station may be part of a communication system that additionally includes a first bus, a second bus and at least two user stations, which are connected to one another via at least the first bus in such a way that they are able to communicate with one another. In this instance, at least one of the at least two user stations is a previously described user station.

The previously mentioned object may also be achieved by an example method for high-data rate CAN-based communication in accordance with the present invention. The method includes the steps: controlling, with the aid of a control unit, an access of the user station via a first bus system to a bus of a second bus system of the communication system, the first bus system being designed for a communication, in which at least at times an exclusive, collision-free access of one of at least two user stations of the communication system to a bus (40) of the first bus system is ensured, and the bus of the second bus system having at least two channels, via which it is possible to transmit messages of the at least two user stations of the communication system in different separate frequency ranges temporally independently of one another.

Additional possible implementations of the present invention also include combinations of features or specific embodiments not explicitly mentioned above or below with regard to the exemplary embodiments. In this context, one skilled in the art will also add individual aspects as improvements or supplementations to the respective basic form of the present invention.

BRIEF DESCRIPTION OF THE DRAWINGS

The present invention is explained below in greater detail with reference to the figures and on the basis of exemplary embodiments.

DETAILED DESCRIPTION OF EXAMPLE EMBODIMENTS

Figure 1:
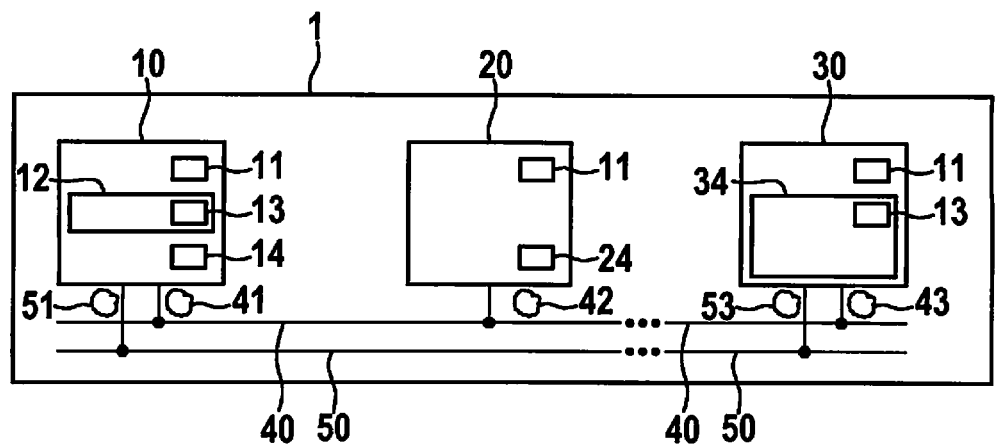
FIG. 1 shows a simplified block diagram of a communication system according to a first exemplary embodiment.

Unless indicated otherwise, identical or functionally equivalent elements have been provided with the same reference numerals.

FIG. 1 shows a communication system 1 which may be used in a vehicle, in particular a motor vehicle, an airplane, etc., or in a hospital, etc.

In FIG. 1, communication system 1 has a plurality of user stations 10, 20, 30, which are respectively connected to a first bus 40 and possibly to a second bus 50. Messages 41, 42, 43 may be transmitted via first bus 40 in the form of signals between the individual user stations 10, 20, 30. Messages 51, 53 may be transmitted via second bus 50 in the form of signals between the individual user stations 10, 30. User stations 10, 20, 30 may be control units or display devices of a motor vehicle for example.

Together with the plurality of user stations 10, 20, 30, first bus 40 forms a first bus system. The first bus system may be for example a CAN bus system, a CAN FD bus system, etc. Very generally, the first bus system in the present exemplary embodiment is designed for a communication in which at least at times an exclusive, collision-free access of one of user stations 10, 20, 30 to first bus 40 is ensured.

Together with the plurality of user stations 10, 30, second bus 50 forms a second bus system. Via the second bus system, it is possible to transmit messages 51, 53 in a higher rate data format than via the first bus system.

As shown in FIG. 1, user station 10 has a communication control device 11, a control unit 12 having a memory device 13, and a transceiver device 14. User station 20 by contrast has a communication control device 11 and a transceiver device 24. User station 30 has a communication control device 11, a memory device 13, and a transceiver device 34. Control unit 12 and transceiver devices 14, 34 of user stations 10, 30 are respectively connected directly to first bus 40 and to second bus 50, even if this is not shown in FIG. 1. Transceiver device 24 of user station 20 is connected directly to first bus 40, even if this is not shown in FIG. 1.

Communication control devices 11 are respectively used for controlling a communication of the respective user stations 10, 20, 30 via first bus 40 with another user station of the user stations 10, 20, 30 connected to first bus 40. For this purpose, communication control device 11 may create or read at least one message 41, 51 or 43, 53 for/from at least one additional user station of communication system 1. For this purpose, communication control device 11 may be designed like a conventional CAN controller.

Control unit 12 is able to control a communication of user stations 10 via second bus 50 with another user station 30, 10 of the user stations 10, 30 connected to second bus 50. Memory device 13 is able to store data regarding an occupancy of second bus 50. The functions of control unit 12 are also integrated in transceiver device 34 so that transceiver device 34 is also a control unit.

Via first bus 40, transceiver devices 14, 24, 34 are able to transmit messages 41, 42, 43, which were created by one of user stations 10, 20, 30, to the other of user stations 10, 20, 30 or receive a message that was transmitted by one of the other user stations 10, 20, 30. Transceiver devices 14, 24 may be designed like a conventional CAN transceiver with regard to their transmitting and receiving functionality. Additionally, in the same way as control unit 12, transceiver device 34 is able to transmit via second bus 50 messages 53, which were created by user station 30, to the other user station(s) 10 or receive a message 41, 42, 43, 51, which were transmitted by one of the other user stations 10, 20. Memory device 13 is designed as previously described.

By way of the two user stations 10, 30, it is possible to implement a robust formation and subsequent transmission of messages 51, 53 even at higher data rates than CAN FD. User station 20, by contrast, corresponds both in terms of its transmitting functionality as well as its receiving functionality to a conventional CAN user station and transmits messages 42 in accordance with the CAN protocol.

Control unit 12 and transceiver device 34 are used to ascertain occupancy information for an access to a predetermined channel of second bus 50 in order to carry out an arbitration for second bus 50 via first bus 40.

The transmission method used for this purpose combines a high-rate transmission system having multiple possible transmission frequencies in the high-frequency range (HF) on second bus 50 with a CAN system on first bus 40. The CAN system is used for regulating the channel access of second bus 50. A parallel bus structure for the two buses 40, 50 is assumed as topology, access to bus 50 occurring in CAN-based fashion via the usual CAN arbitration with additional access mechanisms, which will be described below.

Accordingly, a CAN system is operated on first bus 40 and an HF system having multiple carriers or channels K1, K2, etc. in parallel on second bus 50, it being possible for the two buses 40, 50 to be implemented either on the same or on separate parallel media.

Figure 2:
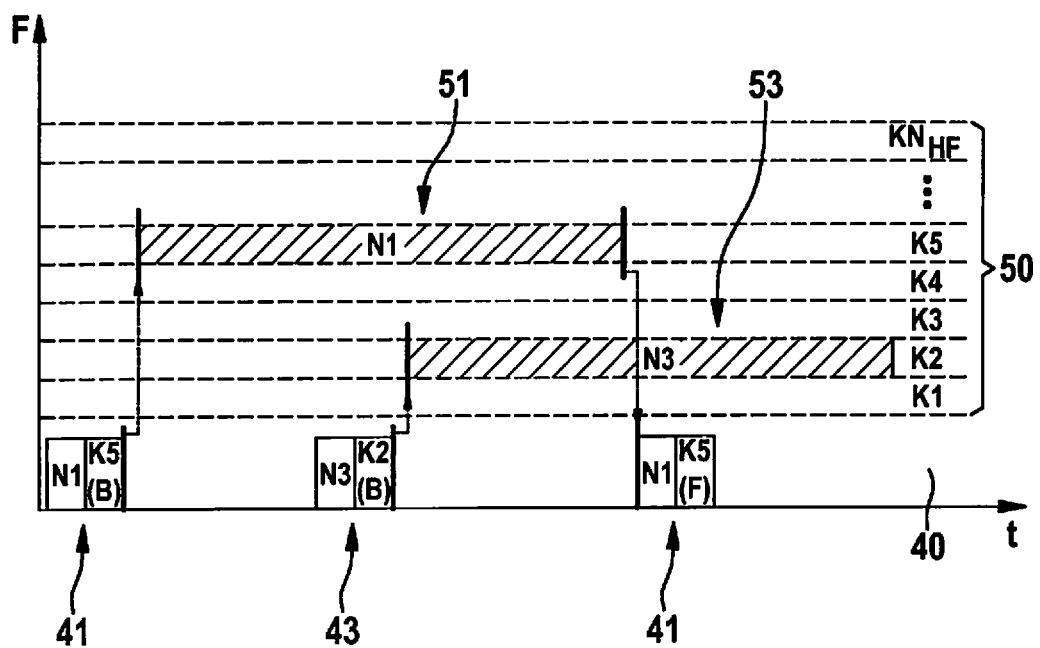
FIG. 2 shows a schematic representation of a transmission of messages in the communication system according to the first exemplary embodiment.

FIG. 2 shows in a diagram of frequency F over time t that the HF range is divided into NHF carriers and is referenced via a channel number K1, K2, . . . KNHF. In order to allocate the HF medium, the second bus 50, it is assumed that all user stations 10, 30 monitor the messages 41, 42, 43 on the CAN medium, the first bus 40, and store the status for each channel K1, K2, . . . KNHF in memory device 13. Consequently, for each channel K1, K2, . . . KNHF, the status busy (B) or free (F) is stored in a list or table.

If a user station 10, 30 wants to transmit a message 51, 53, each message 51, 53 having a fixed CAN ID N1, N2, . . . in accordance with the CAN matrix, then user station 10, 30 selects a free channel, for example channel K5 or K2, from the channel status table and begins with the arbitration on the CAN channel implemented by first bus 40.

FIG. 2 shows as an example the arbitration of a message 51 with the identifier N1 for channel K5, which wins the arbitration. The channel occupancy of channel K5 is communicated in the data portion of the associated message 41 as message N1 (K5, B) on bus 40. In this respect, there are two message types, namely, occupancy and release, respectively with a channel/carrier number, as shown in FIG. 2. Since only message 51 with identifier N1, which won the arbitration, can also be transmitted by associated user station 10, 30, channel K5 is hereby updated in the occupancy tables of all user stations 10, 30 as "busy". This allows for the transmission of message 51 having identifier N1 on channel K5, as illustrated in FIG. 2.

In order to allow for a dynamic length of message 51, the CAN channel implemented with bus 40 is freed again immediately, and the transmission on channel K5 may be continued as long as desired. As soon as message 51 having identifier N1 has been transmitted completely, message 51 having identifier N1 is terminated. In addition, channel K5 is carried out by the transmission of a free-message as another message 41 in the form of a message N1 (K5, F) on the CAN channel implemented with bus 40. The free-message in the form of message N1 (K5, F) runs through the arbitration, the channel occupancy of K5 now being communicated as free in the data portion of message N1 (K5, F). If the arbitration does not work, message N1 (K5, F) must wait.

The transmission of message 53 having identifier N3 on channel K2 occurs in the same manner.

Each user station 10, 30 is able to allocate only one channel K1, K2, . . . for a message 51, 53 having identifier N2, N2, N3 . . . and must subsequently also release it again. All user stations 10, 30 monitor the arbitration and messages 41, 42, 43 on first bus 40 in order to update the occupancy information following the arbitration. An overloading of first bus 40 as CAN control channel is prevented since in the event that all channels K1, K2, . . . KNHF are occupied, only free-messages are allowed. In all other cases, the arbitration resolves the new occupation of one of channels K1, K2, . . . KNHF always with the message that has the highest priority. For this purpose, the priority handling may be modified by adapting the CAN message identifiers N1, N2, . . . and supplemented, if appropriate, by the status busy (B) or free (F).

In communication system 1, it is thus possible to implement a method for high-data rate CAN-based communication, in which communication control device 11 of user station 10 creates for example a message 51 for user station 30, in which either simultaneously or subsequently occupancy information B, F is ascertained for an access to a predetermined channel K1, K2, . . . KNHF of second bus system 50 by carrying out an arbitration over first bus system 40, and in which the message created by communication control device 11 is transmitted via the predetermined channel of second bus 50 to user station 30 if the arbitration has concluded positively.

According to a modification of the first exemplary embodiment, it is possible for a message 51, 53 on second bus 50 to have approximately twice the length of a message 41, 42, 43 on first bus 40 so that during the occupation and release of all NHF channels of second bus 50 it is possible to transmit on average all necessary 2NHF messages 41, 42, 43 on first bus 40. This makes it possible to achieve a high efficiency of bandwidth usage.

According to another modification of the first exemplary embodiment, it is possible generally to agree on a maximum busy time TBmax so that a new user station 10, 30 only has to wait only for this time period in order to know all occupancy statuses of the HF channels with certainty. In FIG. 2, the maximum busy time TBmax could correspond to the length of message N1 or N3. During the occupancy, it is then optionally possible to "represent" an extension of the occupancy so that a longer occupancy than TBmax is also possible. In this case, however, the new arbitration with occupancy notification must occur within time TBmax.

In this modification of the first exemplary embodiment, it is also possible to use fixed signaling patterns with automatic release following TBmax, without a release message having to be sent. In this case, long messages can be handled via segmentation.

According to yet another modification of the first exemplary embodiment, a user station 10, 30, which wants to transmit on one of channels K1, K2, . . . KNHF and is already in arbitration, is able monitor this channel during the arbitration phase in order to ensure that there is really no channel use by another user station 30, 10. This makes it possible to verify possibly erroneous channel occupancy entries in memory device 13. If a channel occupancy and thus channel usage by another user station 30, 10 is determined, then it is still possible to declare the message as invalid even after the arbitration by error burst transmission.

According to yet another modification of the first exemplary embodiment, receivers having a different number of usable frequencies are used in transceiver devices 14, 34 and/or control unit 12. As a consequence, user stations 10, 30 in operation only need to monitor a lower number of channels K1, K2, . . . KNHF. This reduces the memory requirement of memory device 13 and speeds up the transmission and reception of messages by user stations 10, 30.

According to yet another modification of the first exemplary embodiment, dynamic bandwidths, that is, a flexible bundling of channels K1, K2, . . . KNHF, are used. This makes it possible to adapt communication system 1 flexibly to the respective application.

Figure 3:
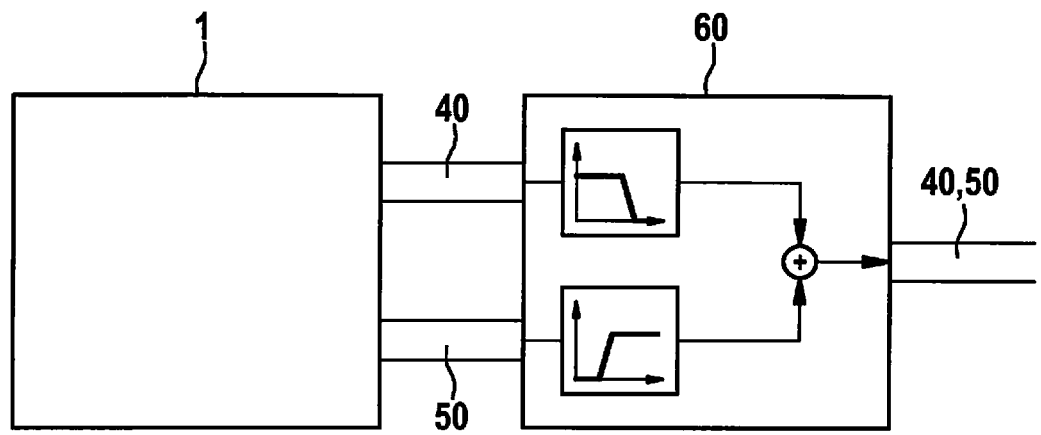
FIG. 3 shows a block diagram of a layout of inputs and outputs of a communication system according a second exemplary embodiment.

FIG. 3 shows a wiring of the inputs and outputs of buses 40, 50 according to a second exemplary embodiment. The communication system according to the present exemplary embodiment is constructed in the same manner as described in the preceding exemplary embodiment with reference to FIG. 1 and FIG. 2.

According to FIG. 3, buses 40, 50 are connected to an external splitter 60. The two line outputs of buses 40, 50 are thus joined via the splitter 60 to a common bus line, as shown in FIG. 3 on the right side of splitter 60. Splitter 60 may be designed as a combined low-pass filter for the passage of the frequencies of first bus 40 and high-pass filter for the passage of the frequencies of second bus 50.

This results in multiple possible applications for a product that is then able to implement the two methods of buses 40, 50 separately. Using the product, however, depending on the application, the two systems may be operated jointly or separately, as independent communication networks. In a joint operation, there is the possibility of working either with separate lines for buses 40, 50 and to control only the access via the CAN bus or to combine the two line outputs via the external splitter 60 to one joint bus line for buses 40, 50.

Figure 4:
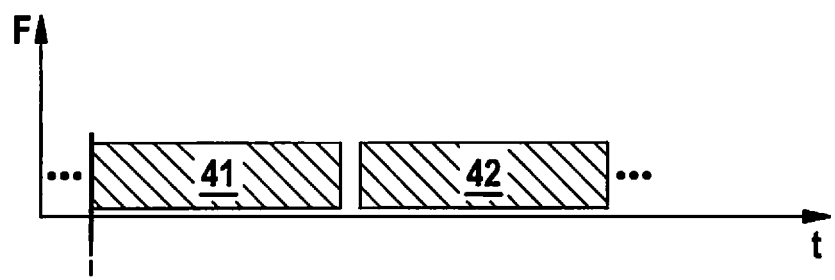
FIG. 4 shows a schematic representation of a transmission of messages in a communication system according to a second exemplary embodiment.
Figure 4:
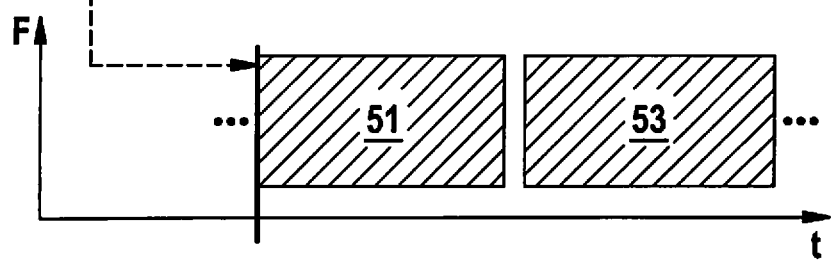

FIG. 4 shows a transmission of messages in a communication system according to a third exemplary embodiment. The communication system according to the present exemplary embodiment is also constructed in the same manner as described in the first exemplary embodiment with reference to FIG. 1. Thus, in the communication system according to the present exemplary embodiment, messages 41, 42, 43 are also transmitted on first bus 40 and, according to another method, messages 51, 53 are transmitted on the second bus 50. Second bus 50 is developed in parallel to first bus 40 and as a separate line. In addition, a second communication and modulation method is used on second bus 50 in the broadband range.

In the communication system according to the present exemplary embodiment, the transmission in a coordinated form on the two independent buses 40, 50 is also designed in such a way that the first bus 40, for example a CAN bus, is used for media access, including arbitration, and a communication on second bus 50 is coordinated via first bus 40. In the present exemplary embodiment, this occurs in that here identical time windows are used, which are, however, arranged in a temporally offset manner, as illustrated in FIG. 4.

This advantageously makes it possible to start the communication on the second bus 50 by messages 51, 53 following the arbitration on the first bus.

Figure 5:
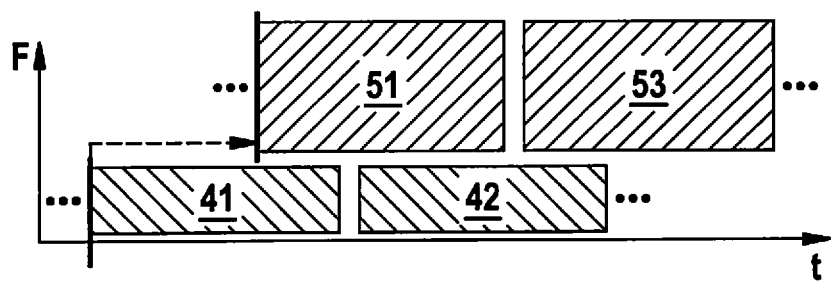
FIG. 5 shows a schematic representation of a transmission of messages in a communication system according to a third exemplary embodiment.

FIG. 5 shows a transmission of the messages in a communication system according to a fourth exemplary embodiment. The communication system according to the present exemplary embodiment is also constructed in the same manner as described in the first exemplary embodiment with reference to FIG. 1. Thus, in the communication system according to the present exemplary embodiment, messages 41, 42, 43 are also transmitted on first bus 40 and messages 51, 53 are transmitted on the second bus 50 according to another method. Second bus 50 is developed in parallel to first bus 40 in a common line with first bus 40. In addition, a second communication and modulation method is used on second bus 50 in the broadband range.

As in the previous exemplary embodiment, in which communication occurs on a bus line using different modulation methods with low (CAN) and high (robust transmission at high data rate) frequency range, it is possible to implement a coordinated design of both methods with CAN arbitration in a corresponding manner as when using separate bus lines.

As shown in FIG. 5, here too the essential separation of the two methods of buses 40, 50 occurs in the frequency range. The transmission on second bus 50 occurs at higher frequencies than on first bus 40. At the same time, the media access is coordinated via the arbitration on first bus 40 and the length of messages 41, 42, 43, as shown in FIG. 4. Here too, it is possible to use the time offset, but it is not necessary.

For an implementation of buses 40, 50 on a single line, the individual communication methods shown in FIG. 5, to be sure, are designed in such a way that fundamentally they do not overlap in the frequency range.

All previously described embodiments of communication system 1, user stations 10, 20, 30, of buses 40, 50 and of the method may be used individually or in all possible combinations.

In particular, it is possible to combine as desired all features of the previously described exemplary embodiments. In addition, the following modifications are possible in particular.

The previous first bus system having bus 40 according to the exemplary embodiments is described with reference to a bus system based on the CAN protocol. The first bus system according to the exemplary embodiments, however, may also be another type of communication network. It is advantageous, but not a necessary prerequisite, that in communication system 1, in the first bus system, an exclusive, collision-free access of a user station 10, 20, 30 to a common channel is ensured at least for certain time spans.

It is also possible to operate more than one bus 50 in parallel to first bus 40. Communication control devices 11, memory device 12 and transceiver device 13 must be designed accordingly. In the case of multiple systems, a combination of only individual subsystems via the splitter circuit of FIG. 3 and an observation of separate buses 40, 50 is possible.

The number of user stations 10, 20, 30 may be chosen arbitrarily. It is also possible that only user stations 10, 30 exist in communication system 1.

The functionality described here, which goes beyond the functions of a conventional CAN transceiver, may also be executed by communication control device 11 or by a separate transceiver. This supports a migration from CAN via CAN FD to new products that have additional high-rate operating modes.

Several transmission formats are available for transmission on a channel of second bus 50. For example, it is possible to use a carrier-based transmission, in which modulation symbols of a quadrature amplitude modulation (QAM) are modulated upon a carrier frequency. A modulation of the carrier is also possible directly in the digital range when using an appropriate scanning rate.

Aside from pulse amplitude modulation (PAM), it is possible to use orthogonal frequency division multiplexing (OFDM) as a possible design for one (or multiple) additional systems as second bus 50. For this purpose, the data to be transmitted are mapped onto symbols of multiple carriers and associated with the individual frequencies of an OFDM symbol.

The high-rate transmission mode on second bus 50 may be carried out as an additional operating variant in that corresponding communication control device 11 or control unit 12 or transceiver device 34 commands all previous CAN modes, including CAN FD, partial networking, etc.

The high-rate transmission mode via second bus 50 is implemented in such a way that it is able to be operated in coexistence to previous CAN modes, including CAN FD, partial networking, etc.

The partitioning of the functionality in a communication control device 11 or control unit 12 or transceiver device 34 may also be implemented by being distributed to multiple components. The purpose of this is to achieve an implementation that corresponds as closely as possible to previous CAN controllers and CAN transceivers. Analog as well as digital interfaces may be used for connecting multiple components.

A CAN communication line for first bus 40 normally includes, in addition to the CAN controller in accordance with communication control device 11, also the CAN transceiver in accordance with transceiver device 14, 24, 34 and a common mode choke (CMC). These components may exist on the one hand on the system side, as shown in FIG. 3 on the left side, or may be integrated on the external side into the observing splitter 60.

What is claimed is:

1. A first user station of at least two user stations of a communication system, the communication system including a first bus system and a second bus system, the communication system being configured with assignment to each of at least one of the at least two user stations of a respective time period in which the respective user station is provided exclusive access to the first bus system, the first user station comprising:
 a control unit for controlling an access of the first user station to transmit messages over a bus of the second bus system while other messages are transmitted over a bus of the first bus system;
 wherein:
  the controlling is performed by the control unit transmitting on the bus of the first bus system a message that affects the access of the first user station to the bus of the second bus system without affecting access of the first user station to the bus of the first bus system;
  the bus of the second bus system includes at least two channels by which messages of the at least two user stations of the communication system are simultaneously transmittable in different separate frequency ranges; and
  at least one of:
   (a) the controlling of the access of the first user station to the bus of the second bus system is such that a message is transmittable by the first user station over the bus of the second bus system during a period during which messages are not transmittable by the first user station over the first bus system; and
   (b) the use of the first bus system for the controlling includes transmitting over the first bus system a message to at least one other of the at least two user stations identifying a status of the second bus system.

2. The first user station as recited in claim 1, wherein the control unit, following the enabling of an access of the first user station to one of the at least two channels of the bus of the second bus system, provides to the first user station access to the respective channel for an arbitrary period of time in order to transmit a message of arbitrary length via the respective channel of the second bus system.

3. The first user station as recited in claim 1, wherein the first bus system is designed for transmitting messages according to the CAN protocol and the second bus system is designed for transmitting messages via at least two high-frequency channels and for higher rate communication than via the first bus system.

4. The first user station as recited in claim 1, wherein the bus of the first bus system and the at least two channels of the second bus system are implemented on the same medium.

5. The first user station as recited in claim 1, wherein the control unit is designed to transmit, prior to transmitting a message via a predetermined channel of the second bus system, a message to at least one other of the at least two user stations and via the bus of the first bus system that the predetermined channel is busy, and the control unit is designed, to transmit, following termination of the transmission of the message and via the predetermined channel of the second bus system, a message to the at least one other of the at least two user stations about the termination via the first bus system.

6. The first user station as recited in claim 1, further comprising:
 a memory device storing information about an occupancy status of the at least two channels of the second bus system, wherein the control unit is designed to monitor the current occupancy status of the at least two channels of the second bus system and to update the information about the occupancy status stored in the memory device on the basis of the monitoring.

7. The first user station as recited in claim 1, wherein at least one of: i) a bundling of the at least two channels is flexible, and ii) in the first user station, a number of usable frequencies of the at least two channels for receiving a message differ from a number of usable frequencies for receiving in another of the at least two user stations.

8. The first user station as recited in claim 1, wherein the control unit is designed to arrange messages in an order of priority by which periods of exclusive access to a channel of the second bus system are assigned to the at least two user stations.

9. The first user station as recited in claim 1, wherein the at least one of the at least two user stations includes the first user station, and the controlling of the access of the first user station to the bus of the second bus system is such that a message is transmittable by the first user station over the bus of the second bus system during the period during which messages are not transmittable by the first user station over the first bus system.

10. The first user station as recited in claim 1, wherein the use of the first bus system for the controlling includes the transmitting, over the first bus system to the at least one other of the at least two user stations, of the message identifying the status of the second bus system.

11. The first user station as recited in claim 10, wherein the control unit is configured to, for a transmission of a message over the bus of the second bus system, transmit the message identifying the status of the second bus system, the status being a busy status.

12. The user station as recited in claim 1, wherein a length of a message transmitted over the at least two channels of the second bus system is approximately equal to twice the length of a message that is defined for the first bus system.

13. The user station as recited in claim 1, wherein a maximum busy time of the at least two channels of the second bus system is defined.

14. The user station as recited in claim 1, wherein fixed signaling patterns with automatic release following a maximum busy time is defined for the second bus system.

15. The user station as recited in claim 1, wherein the first bus system and the at least two channels of the second bus system are implemented on separate parallel media.

16. A communication system, comprising:
a first bus;
a second bus; and
at least two user stations connected to one another to be able to communicate with one another via at least the first bus;
wherein:
- each of at least one of the at least two user stations is assigned a respective time period in which the respective user station is provided exclusive access to the first bus;
- a first one of the at least two user stations includes a control unit for controlling, an access of the first user station to transmit messages over the second bus while other messages are transmitted over the first bus;
- the controlling is performed by the control unit transmitting on the first bus, and not on the second bus, a message that affects the access of the first user station to the second bus without affecting access of the first user station to the first bus;
- the second bus includes at least two channels by which messages of the at least two user stations of the communication system are simultaneously transmittable in different separate frequency ranges; and
- at least one of:
  (a) the controlling of the access of the first user station to the second bus is such that a message is transmittable by the first user station over the second bus during a period during which messages are not transmittable by the first user station over the first bus; and
  (b) the use of the first bus for the controlling includes transmitting over the first bus a message to at least one other of the at least two user stations identifying a status of the second bus.

17. A method for high-data rate CAN-based communication in a communication system that includes a first bus system, a second bus system, and at least two user stations, the communication system being configured with assignment to each of at least one of the at least two user stations of a respective time period in which the respective user station is provided exclusive access to the first bus system, the method comprising:
controlling, by a control unit, an access of a first one of the at least one of the at least two user stations to transmit messages over a bus of a second bus system while other messages are transmitted over a bus of the first bus system;
wherein:
- the controlling is performed by the control unit transmitting on the bus of the first bus system a message that affects the access of the first user station to the bus of the second bus system without affecting access of the first user station to the bus of the first bus system;
- the bus of the second bus system includes at least two channels by which messages of the at least two user stations of the communication system are simultaneously transmittable in different separate frequency ranges; and
- at least one of:
  (a) the controlling of the access of the first user station to the bus of the second bus system is such that a message is transmittable by the first user station over the bus of the second bus system during a period during which messages are not transmittable by the first user station over the first bus system; and
  (b) the use of the first bus system for the controlling includes transmitting over the first bus system a message to at least one other of the at least two user stations identifying a status of the second bus system.

* * * * *